United States Patent [19]
Piper

[11] 4,021,892
[45] May 10, 1977

[54] ADJUSTABLE SECURITY STRAPS

[75] Inventor: Alfred E. C. Piper, Hillingdon, England

[73] Assignee: ITW Limited, Slough, England

[22] Filed: Mar. 5, 1976

[21] Appl. No.: 664,350

[30] Foreign Application Priority Data

Mar. 20, 1975 United Kingdom ............ 11600/75

[52] U.S. Cl. .................................. 24/274 R; 85/61
[51] Int. Cl.² ......................................... F16L 33/08
[58] Field of Search ...... 24/274 R, 274 P, 274 WB, 24/274; 85/61

[56] References Cited
UNITED STATES PATENTS

| | | | |
|---|---|---|---|
| 2,530,899 | 11/1950 | Mueller | 292/307 R |
| 2,940,150 | 6/1960 | Rizzo | 24/274 R |
| 3,311,959 | 4/1967 | Schaub | 24/274 R |
| 3,498,174 | 3/1970 | Schuster | 85/61 |
| 3,712,655 | 1/1973 | Fuehrer | 292/317 |
| 3,914,832 | 10/1975 | Petrus | 24/274 R |

FOREIGN PATENTS OR APPLICATIONS 867,643   5/1961   United Kingdom ................. 85/61

Primary Examiner—Bernard A. Gelak
Attorney, Agent, or Firm—Jack R. Halvorsen; Robert W. Beart

[57] ABSTRACT

The invention relates to straps which include an elongate strap portion, a housing at one end of the strap and a screw member which is adapted to be positioned in the housing to draw the strap portion through the housing. In particular, the invention relates to straps which are easily drawn to a predetermined tension about an article by means of a screw member having a weakened section between the head and the threaded shank. The weakened section fractures when a predetermined torque on the screw member is reached, preventing overtightening and also indicating that the required tension in the strap portion has been reached. The screw may have two heads, the second head being revealed when the first breaks off, to permit the strap portion to be released. Straps according to the invention may also be used as security seals, if no second head is provided, as then the strap must be broken to be removed.

9 Claims, 8 Drawing Figures

ADJUSTABLE SECURITY STRAPS

The invention relates to straps which can be formed into a closed loop around an article, the loop being then tightened to exert a grip around the article. There are various circumstances in which it is desirable to ensure that the strap is tightened to at least a predetermined minimum tension. It may also be desirable to ensure that the strap cannot be tightened beyond a predetermined maximum tension.

Present strap devices may only be tightened to predetermined tensions by the use of special tools, and are time-consuming and expensive to apply in quantity in this way.

In motor vehicle cooling systems, where tension straps are used to join rubbber hoses to metal pipes, there is a danger that overtightening the straps will cause them to cut into the rubber hose, and thus cause leakage of coolant. Straps constructed in accordance with the present invention preclude this possibility, by preventing an operative from overtightening the strap.

Many other situations exist in which straps may be used to apply a predetermined peripheral tension to an article, without the use of special tools. Other advantages of straps of the present invention include economy and ease of application.

In another embodiment and application of this invention, the tension limiting device is used in the security field, for example, at public swimming pools or other sports facilities, where clothes etc. are deposited for short periods.

According to the present invention, a tension strap comprises an elongated strap portion, a substantially cylindrical housing part, and a screw member, the housing part having a substantially hollow interior, and being attached to one end of the strap portion, the screw member having a head and a threaded shank joined by a weakened section, the shank being positioned, in use, inside the housing part, and the housing part having a slot communicating with its interior adjacent to the shank, the free end of the strap portion being passed, in use, through the slot in such a way that the screw member may engage complementary grooves formed in the strap portion, rotation of the screw member causing the strap portion ot be drawn through the housing part.

Preferably, the strap portion, housing part, and screw member are formed of plastics material. The strap portion housing part, and screw member may be formed integrally, or the strap portion and housing part may be integrally moulded and a separate screw member used to complete the assembly.

The invention will be further described below, with reference to the accompanying drawings, in which.

Figure 6:
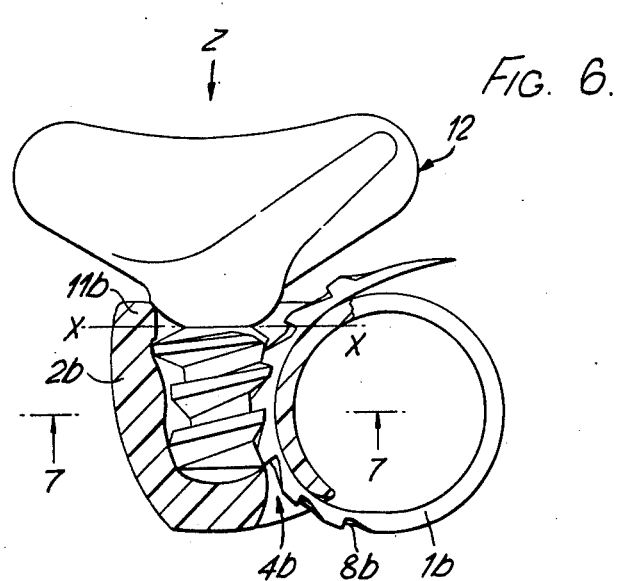
FIG. 6 shows yet another arrangement of the security strap, in enlarged part section.
Figure 7:
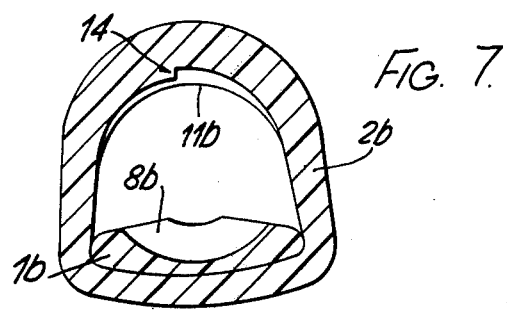
Figure 8:
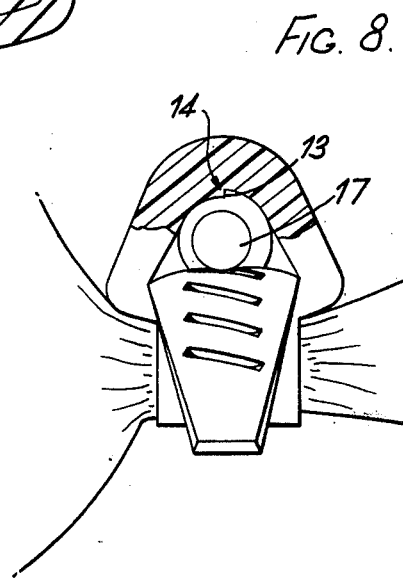

FIG. 7 is an enlarged section taken along the line 7—7 of FIG. 6, omitting the screw member, to show the shape of the housing portion; and, FIG. 8 is a view, in part section in the direction of arrow 2 in FIG. 6, of the strap shown in FIGS. 6 and 7 applied to the neck of a plastics bag, the head of the screw member having been removed.

Figure 1:
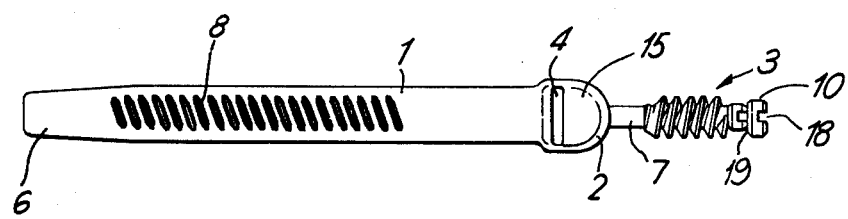
FIG. 1 is a plan of a tension strap, according to the invention.
Figure 2:
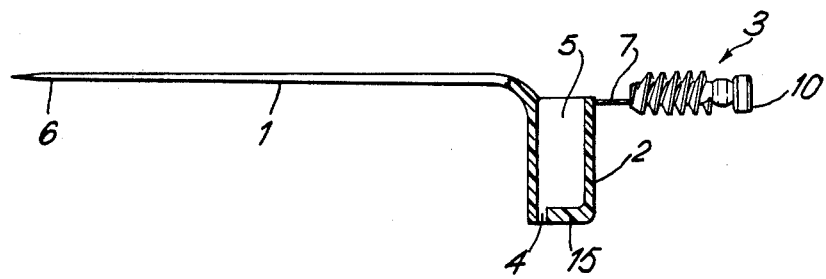
FIG. 2 is a side elevation of the strap shown in FIG. 1, in part section.

Referring now to FIGS. 1 to 4, there is shown a strap capable of applying a predetermined tension around an article. The strap comprises a band portion 1, integrally attached to one end of a hollow semi-cylindrical housing part 2. A screw member 3, shown in FIG. 2, is attached in this embodiment to the housing part 2, at the same end as the strap. The housing part 2 has a slot 4 in its end wall 15 remote from the strap 1, and a substantially semi-circular or D-shaped aperture 5 at its end nearest the strap 1.

Figure 4:
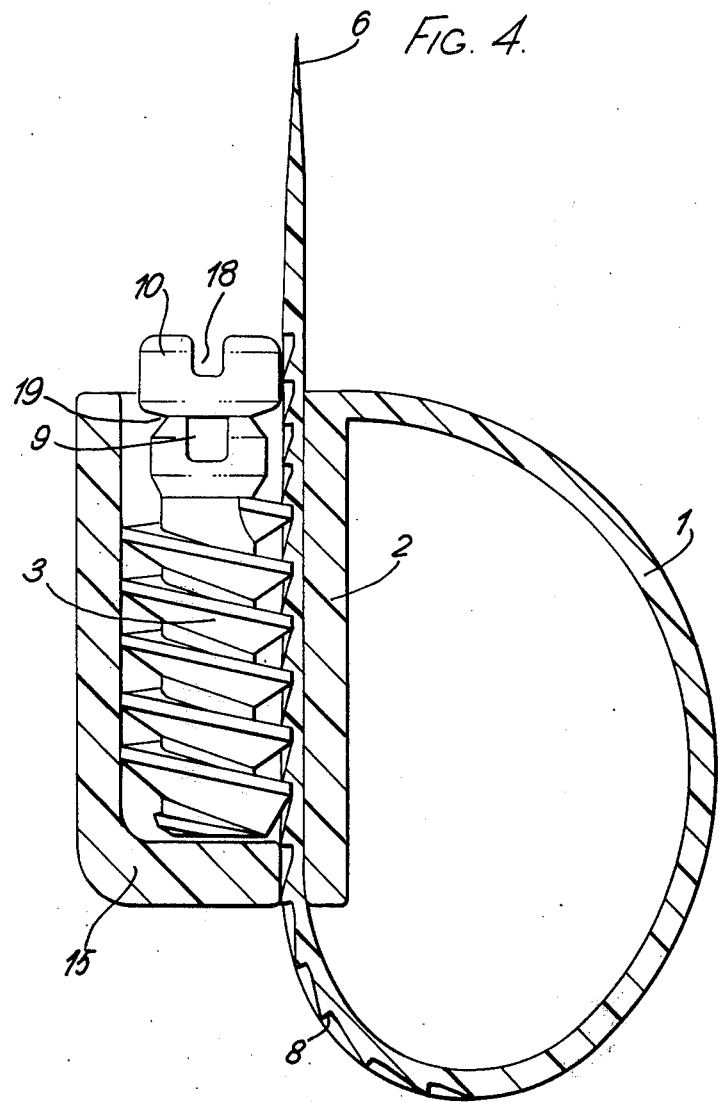
FIG. 4 is an enlarged part-sectional view of the strap shown in FIG. 1, showing the free end of the strap portion, and the screw member, inserted in the housing part.

To apply the strap to an article, the band portion 1 is passed around the article, and its free end 6 is then inserted into the slot 4 in the end wall 15 of the housing part 2. The screw member 3, which is attached to the housing part by a weak bridge 7, is swung into alignment with the housing part. A screwdriver is then engaged with a slot 18 in the head 10 of the screw member, and the screw member is rotated. This causes the weak bridge 7 to break, allowing the screw member to be pushed into the housing part, engaging a series of slots 8 on the band portion 1, and abutting the slotted end wall 15 of the housing part, as seen in FIG. 4. The screw is then rotated, tightening the strap 1, until a predetermined torque is reached.

Figure 3:
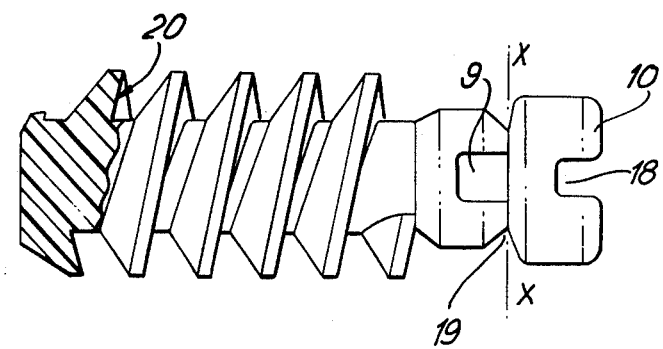
FIG. 3 is an enlarged part-sectional view of the screw member of the strap shown in FIGS. 1 and 2.

The screw member is formed with a slot 9, and a neck 19, which causes the section X—X, seen in FIG. 3, to be weakened to such an extent that when the required torque is reached, shear failure occurs at this section. The separated head 10 of the screw member 3 may then turn, but does not turn the screw member 3.

The head 10 of the screw member 3, when the correct predetermined torque is reached, breaks off the screw memberby shear failure at the section X—X. This prevents the strap being tightened beyond the correct tension, and also indicates if the correct tension is not reached.

The head 10 is then removed, leaving the screw member 3 in position in the housing part 2, and the slot 9 in the screw member exposed.

To remove the strap, for example, when replacing parts fixed by it, a screwdriver may engage the slot 9 to permit opening rotation of the screw member 3.

The strap is only usable in its tension-limiting role once, as the screw member is severed from the head at the required torque. Onceremoved, the strap must be discarded and replaced if the same predetermined tension is to be achieved rapidly.

The bearing face 20 of the thread is undercut slightly, to ensure that when the teeth of the thread are stressed by tightening the strap, the teeth do not yield and jump out of engagement with the slots 8 in the band portion. The angle between the bearing face and the axis of the screw member is arranged never to exceed 90°, even at maximum stress.

A further application for tension bands of this type is in the security field, for example, in situations where articles are deposited for limited periods. Existing systems used at public sports facilities include placing the articles in unsealed containers in the custody of an attendant, or placing the articles in lockable cupboards or cubicles with individual keys under the supervision of an attendant. In the latter case, it is normal to provide the attendant with a master key which opens all the cupboards or cubicles, in case a member of the public mislays the key to his cupboard, for example while swimming.

These systems rely on the integrity of the attendant, as at any time he has access to all articles deposited, and this access is undetectable.

The strap of the present invention may be simply modified to provide a means of sealing a container in such a way as to make undetected access to that container impossible.

Figure 5:
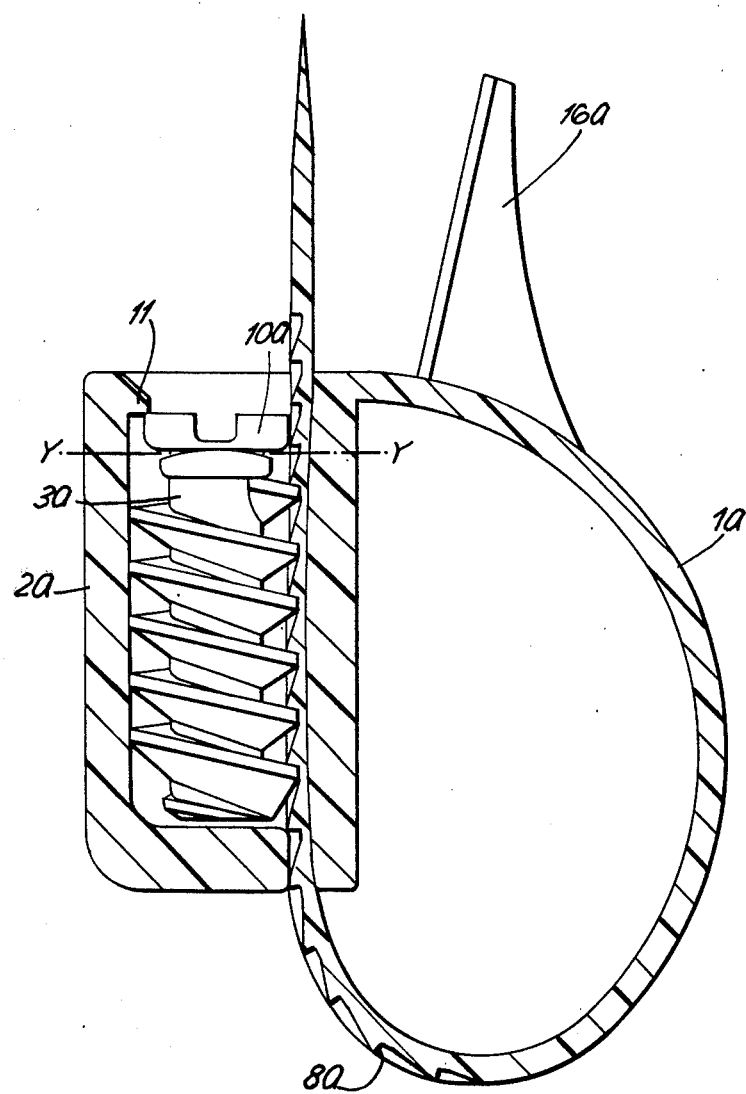
FIG. 5 shows an alternative arrangement of the strap, intended for security application in enlarged part section.

Referring now to FIG. 5 and FIGS. 6, 7 and 8 of the drawings, FIG. 5 shows a modified strap usable in security applications and FIG. 6, 7 and 8 show a further modified version requiring no tools to apply it.

In FIG. 5, there is shown a strap comprising a band portion 1a, a houuusing part 2a, and a screw member 3a. The band is applied, for example around the neck of a plastics bag, in the same manner as the limited-tension strap described above, the screw member deflecting the raised portion 11 on entry by camming engagement with the inclined top surface off the raised portion. The raised portion 11 at the open end of the housing part snaps back after the screw member has passed, and prevents the head 10a from being removed from the housing portion after it has become detached from the screw member by failure of the weakened section. The weakened section may comprise a slot or bore penetrating the screw member in a transverse direction, or may comprise a reduction in cross-sectional area caused by a reduced diameter as shown at Y—Y in FIG. 5. The head 10a is free then to turn, but does not cause the screw member to rotate, preventing both further tightening and release of the strap. The strap may only be released by cutting or otherwise destroying it, and this is immediately apparent. A tab 16a may be provided to facilitate removal by tearing the strap, which may be weakened locally.

FIGS. 6, 7 and 8 show a refined embodiment of the strap, intended for security use. The screw member is formed with a butterfly-type head 12, attached to the threaded part of the screw by a weakened section indicated by the line X—X in FIG. 6.

The mode of operation of this embodiment of the invention is similar to that described above in connection with the strap shown in FIGS. 1 to 4, in that to seal a plastics bag the strap is passed around the gathered neck and threaded through the slot 4b in the housing part 2b. The screw member 3 is then inserted into the housing portion and is rotated to draw the strap tight. The butterfly-type head 12 allows the screw member to be rotated, without the use of tools, until the predetermined torque at which the weakened section X—X fails is reached.

The failure of the section X—X allows the head 12 to be removed, leaving the screw member retained in the housing portion and exposing a smooth face 17, as shown in FIG. 8. This smooth face cannot be gripped to remove the screw without damaging the screw member or housing part.

The thread on the screw member in this embodiment is not a cylindrical helix, as in the previous embodiment, but is reduced in diameter at its mid-portion. This enables the strap to be tightened to small diameters, the housing having curved walls which guide the strap an arcuate path. The undercut thread formation, as described above, is used in this embodiment.

Removal of the screw member shown in FIGS. 6 and 8 from the housing part is further prevented by the formation on the threads of radially extending abutment surfaces, which co-operate with a ridge on the inner surface of the housing part to prevent opening rotation of the screw. The abutment surfaces, shown at 13 in FIG. 8, are formed by a mismatching of the moulds for the thread and provide a ratchet action due to the resilience of the material which only allows the screw member to rotate so as to tighten the strap. The longitudinal rib, shown as 14 in FIG. 7, may run the whole length of the interior of the housing part, or may only extend for a distance equal to the pitch of the thread of the screw member.

This feature of a 'ratchet' thread and a longitudinal rib may be incorporated in any of the embodiments of the invention previously described. The slots 8, 8a and 8b in the straps shown in FIGS. 1 to 8 may also be provided with ridges aligned longitudinally relative to the strap, to prevent removal of the screw member.

Clearly, other head formations incorporation the weakened section between head and screw parts are possible, to be used in conjunction with different driving tools, eg crosshead screwdrivers, spanners etc. The housing part need not be circular in cross-section, but may be substantially triangular, as seen in FIG. 7, or of a 'D' section, as shown in FIG. 1.

I claim:
1. A one-piece plastic strap including an elongate strap portion, a substantially tubular housing part, and a screw member, said housing part being a hollow D-shaped tubular member having one open end and being attached adjacent said open end to one end of said strap portion, said screw member being initially connected by frangible means to said housing, said screw further having a head and a threaded shank joined to one another by a weakened section, said shank being positioned, in use, inside said housing part, said housing part having a closed end remote from said open end and a slot in said closed end adjacent the flat portion of said D-shaped member through which said strap portion may pass, co-operating means on said strap portion including a series of complementary slots on said strap portion adapted to engaging the threads on said screw member, whereby rotation of said screw member causes said strap portion to be drawn through said housing part.

2. A tension strap according to claim 1, wherein said housing part has a resilient raised portion on its inner surface adjacent said open end adapted to engage the weakened section on said screw to retain same within said housing.

3. A tension strap according to claim 1, wherein said housing part has a longitudinal ridge on its inner surface which co-operates with radially extending abutment surfaces on said screw member to inhibit opening rotation of said screw member.

4. A tension strap according to claim 1, wherein said weakened section of said screw member comprises a transverse slot or hole.

5. A tension band according to claim 4, wherein said screw head includes a kerf for engagement by a tool for rotating said head to a predetermined torque to break said weakened section and cause said head to fall off, said transverse slot serving as a secondary tool engaging means for rotation of said screw after said head is broken off.

6. A tension strap according to claim 1, wherein said weakened section of said screw member comprises a local reduction in diameter of said screw member.

7. A tension band according to claim 1, wherein said head of said screw member is adapted to be enngaged by a driving tool.

8. A tension band according to claim 1, wherein said head of said screw member is adapted to be rotated without the use of a tool.

9. A tension band according to claim 1, wherein said strap portion is formed with a tab to facilitate tearing of the strap.

* * * * *